United States Patent
Williams, Sr.

(10) Patent No.: US 10,131,458 B2
(45) Date of Patent: Nov. 20, 2018

(54) ADJUSTABLE CHUTE

(71) Applicant: Raalakhann Llinear Williams, Sr., Richton Park, IL (US)

(72) Inventor: Raalakhann Llinear Williams, Sr., Richton Park, IL (US)

( * ) Notice: Subject to any disclaimer, the term of this patent is extended or adjusted under 35 U.S.C. 154(b) by 0 days.

(21) Appl. No.: 15/435,274

(22) Filed: Apr. 24, 2017

(65) Prior Publication Data

US 2017/0247188 A1 Aug. 31, 2017

Related U.S. Application Data

(60) Provisional application No. 62/300,192, filed on Feb. 26, 2016.

(51) Int. Cl.
| | |
|---|---|
| *B65G 11/02* | (2006.01) |
| *B65G 11/18* | (2006.01) |
| *B65B 39/00* | (2006.01) |
| *B65B 67/12* | (2006.01) |
| *B65F 1/10* | (2006.01) |

(52) U.S. Cl.
CPC ............ *B65B 39/007* (2013.01); *B65B 67/12* (2013.01); *B65F 1/10* (2013.01); *B65G 11/026* (2013.01); *B65G 11/186* (2013.01); *B65F 2240/138* (2013.01); *B65F 2250/114* (2013.01)

(58) Field of Classification Search
CPC ....... B65G 11/02; B65G 11/026; B65G 11/18; B65G 11/186
USPC ......................... 193/4, 30, 34, 2 A
See application file for complete search history.

(56) References Cited

U.S. PATENT DOCUMENTS

| | | | | |
|---|---|---|---|---|
| 1,897,295 A | * | 2/1933 | Blatti ................... | B65G 11/026 193/17 |
| 5,031,277 A | * | 7/1991 | Coker ...................... | A47L 9/14 141/108 |
| 5,127,507 A | * | 7/1992 | McDermott ......... | B65G 11/186 193/17 |
| 5,163,278 A | * | 11/1992 | Martenhoff ............ | A01D 51/00 56/202 |
| 6,085,647 A | * | 7/2000 | Burow .................... | B65B 67/12 100/265 |

(Continued)

FOREIGN PATENT DOCUMENTS

GB           745196 A  *  2/1956

*Primary Examiner* — Mark A Deuble
(74) *Attorney, Agent, or Firm* — Chen-Chi Lin

(57) ABSTRACT

The Adjustable Chute is a user friendly product for consumers to dispose of lawn debris and or grass clippings collected from a grass catcher from a lawn mower. The Adjustable Chute is constructed of durable materials for longevity and reliability purposes. The unique design of the Adjustable Chute with the upper portion rectangular for easy attachment of the grass catchers itself, and lower portion tapered for easy disposal of yard waste or grass clippings, allows hands free transfer of yard waste from a grass catcher through the Adjustable Chute into the waiting collection brown bag. The Adjustable was conceived through personal necessity after realizing how incredibly difficult it is to transfer grass clippings after being collected in a grass catcher from the grass catcher into the brown recycle bag. This time saving product will give consumers peace of mind in knowing they can transfer grass clippings from the grass catcher effortlessly, quickly, neatly and without the need of ever having to touch the grass by hand.

9 Claims, 3 Drawing Sheets

(56) References Cited

U.S. PATENT DOCUMENTS

| | | | | |
|---|---|---|---|---|
| 6,116,548 | A * | 9/2000 | Oleson | B65B 67/1227 |
| | | | | 248/100 |
| 7,036,647 | B2 * | 5/2006 | Malmberg | B65G 11/146 |
| | | | | 193/25 C |
| 8,479,780 | B2 * | 7/2013 | Fernandez | B65F 1/10 |
| | | | | 141/10 |
| 10,053,291 | B1 * | 8/2018 | Van Bogaert | B65G 11/18 |
| 2012/0043433 | A1 * | 2/2012 | Hall | B65B 39/007 |
| | | | | 248/97 |
| 2014/0101895 | A1 * | 4/2014 | White | B65D 33/1616 |
| | | | | 24/30.5 R |
| 2015/0191310 | A1 * | 7/2015 | Benjamin | B65G 11/166 |
| | | | | 193/32 |
| 2017/0265387 | A1 * | 9/2017 | Tanabe | A01D 34/71 |

* cited by examiner

ADJUSTABLE CHUTE

FIELD OF INVENTION

The present invention pertains to the field of lawn maintenance, and more specifically to the field of bagging methods and devices for collection and disposal of lawn waste and debris.

BACKGROUND OF THE INVENTION

The prior art has put forth several designs for bagging methods and devices for collection and disposal for lawn waste and debris.

Among these are:

US Patent Publication 2012/0043433 to Darryl Hall describes an improved embodiment of the funnel that produces a convenient and versatile way of bagging goods and debris. It acts as a helper and allows one person to handle the task of bagging leaves, clothes, garbage and many other things in a timely manner. The improved funnel bagging system compromises a rectangular funnel inlet and four tapered elongated support members which are stackable within each other. The funnel has four trapezoid shaped sides that are integral to aforementioned support members. The funnel bag and support members are usable in stand-alone format or they are adaptable to fit inside a lawn or trash bag such are commonly used to hold waste.

U.S. Pat. No. 6,085,647 to Paul D. Burrow describes a packer for the lawn waste disposal for compacting and channeling the waste into a throwaway bag. The disposer includes an upper portion with converging walls and a lower portion with parallel walls forming a chute into a bag. The entire structure is made of sheet polyethylene an dis entirely rectangular in outline. The upper portion, the converger, is approximately one half the height of the lower portion, the chute, to prevent overbalancing. The chute is polyethylene, of which the disposer is made, and is reinforced at discreet locations, the converging edges and the bottom edge, of plastic of the same type from which the disposer is made to keep the disposer light in weight, yet strong. A folding metal frame supports the disposer at bag height.

U.S. Pat. No. 5,163,278 to James E, Martenhoff describes a lawn and trash bagger for dead leaves, grass clippings, pine needles, and other accumulated lawn debris. The lawn bagger is comprised of a rigid frame structure which provides an unobstructed opening or funnel into a bag which is conveniently held over the back end by a flexible cord, having fastening hooks located at each of its ends. The frame structure also preferably includes a bottom panel extending beyond the vertical plane of a top panel and side panels angled downwardly from the top panel to a form an opening sufficiently large to permit a lawn rake or broom to guide the trash into the converging tunnel, or funnel of the lawn bagger. A handle may be provided on the top panel for convenience of lifting the lawn bagger each time the trash is emptied into the bag. In use, a plastic or paper bag is placed around the open rear of the rigid frame of the lawn bagger and is held in place with the length of elastic or other cord. With the bag in place, the device is placed flat on the ground and the lawn trash is raked or blown directly into it. Picking the lawn bagger up by the handle and holding it upright allows the trash to drop into the bag of its own weight, or the trash may be urged into the bag by hand.

None of these prior the art references describes the present invention.

SUMMARY OF THE INVENTION

It is an object of the present invention to provide a specially configured chute that attaches to the frame of a lawn mower grass catcher bag to function as a bridge or funnel between the grass catcher and a waste collection or trash bag.

BRIEF DESCRIPTIONS OF THE DRAWINGS

DETAILED DESCRIPTION OF THE INVENTION

Gardening and landscaping are important and satisfying aspects of homeownership that allow individuals and couples to use creative intellect and physical strength, contributing different talents to creating something that is both tangible and enjoyable. Whether bordering a home with a vibrant collection of floral beauties, pruning, hedges to alluring and intricate shapes, fashioning a vegetable garden to supply fresh foods or simply mowing a lawn to attractive precision, lawn and garden enthusiasts find joy, relaxation and sense of accomplishment in improving the appearance of the outside landscape around their home.

While yard work provides satisfaction for one's spirit and exercise for one's body, many people who relish the opportunity to participate in landscaping and gardening activities sometimes encounter challenges in their beautification endeavors. Particularly when mowing a lawn, trails of grass shavings typically are left behind the machine, necessitating raking up of debris to present a pristine and picture perfect lawn. To avoid this time consuming process, many homeowners employ a grass catcher which is a large receptacle that attaches directly onto the deck of the mower to collect grass and debris as it is cut. While grass catchers are quite effective in their intended purpose, using these accessories presents a drawback. After the grass catcher is installed and the lawn is mowed, users still face a daunting task of removing a heavy, cumbersome grass catcher and emptying grass shavings contained with the catcher. With so much extra, laborious work added to lawn mowing when using a grass catcher, many consumers find they save themselves a lot of trouble by simply raking away the grass.

Figure 1A:
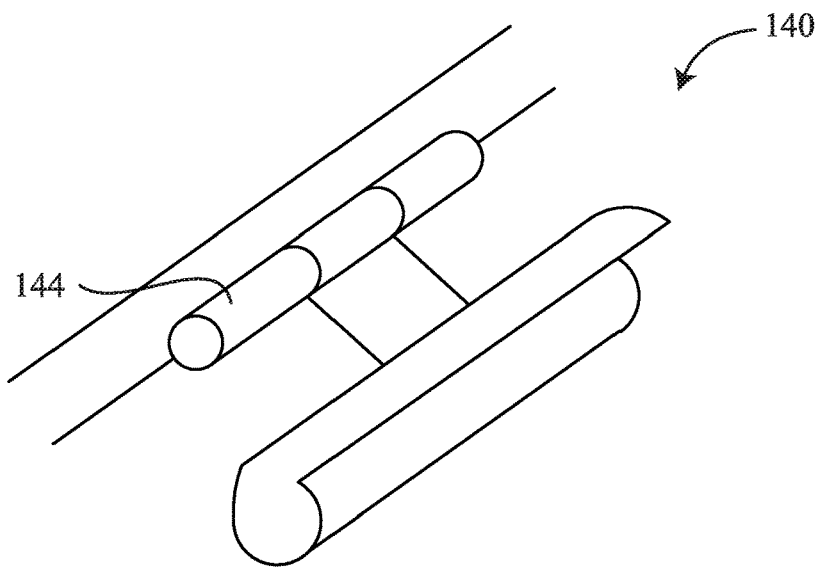
FIG. 1A is a prototypical diagonal view of a clamping system in examples of the present disclosure.
Figure 1:
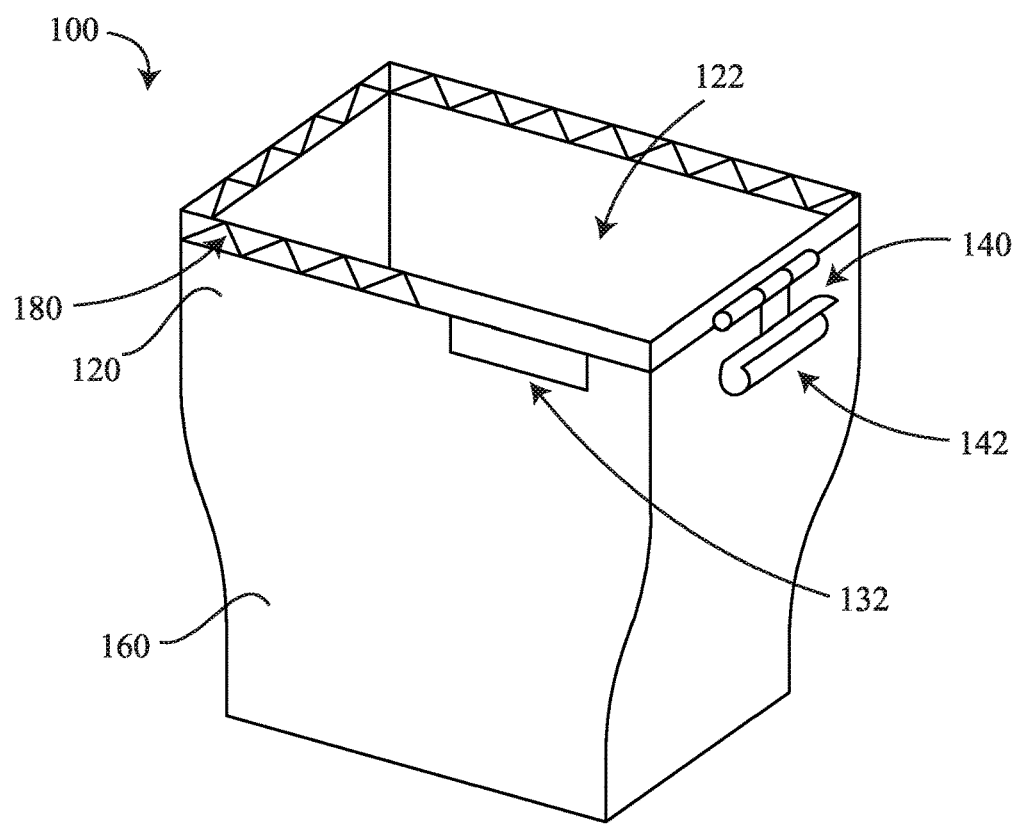
FIG. 1 is a prototypical diagonal view of the present invention showing integral bag tab mounts for easy attachment to a lawn mower grass bag.
Figure 2:
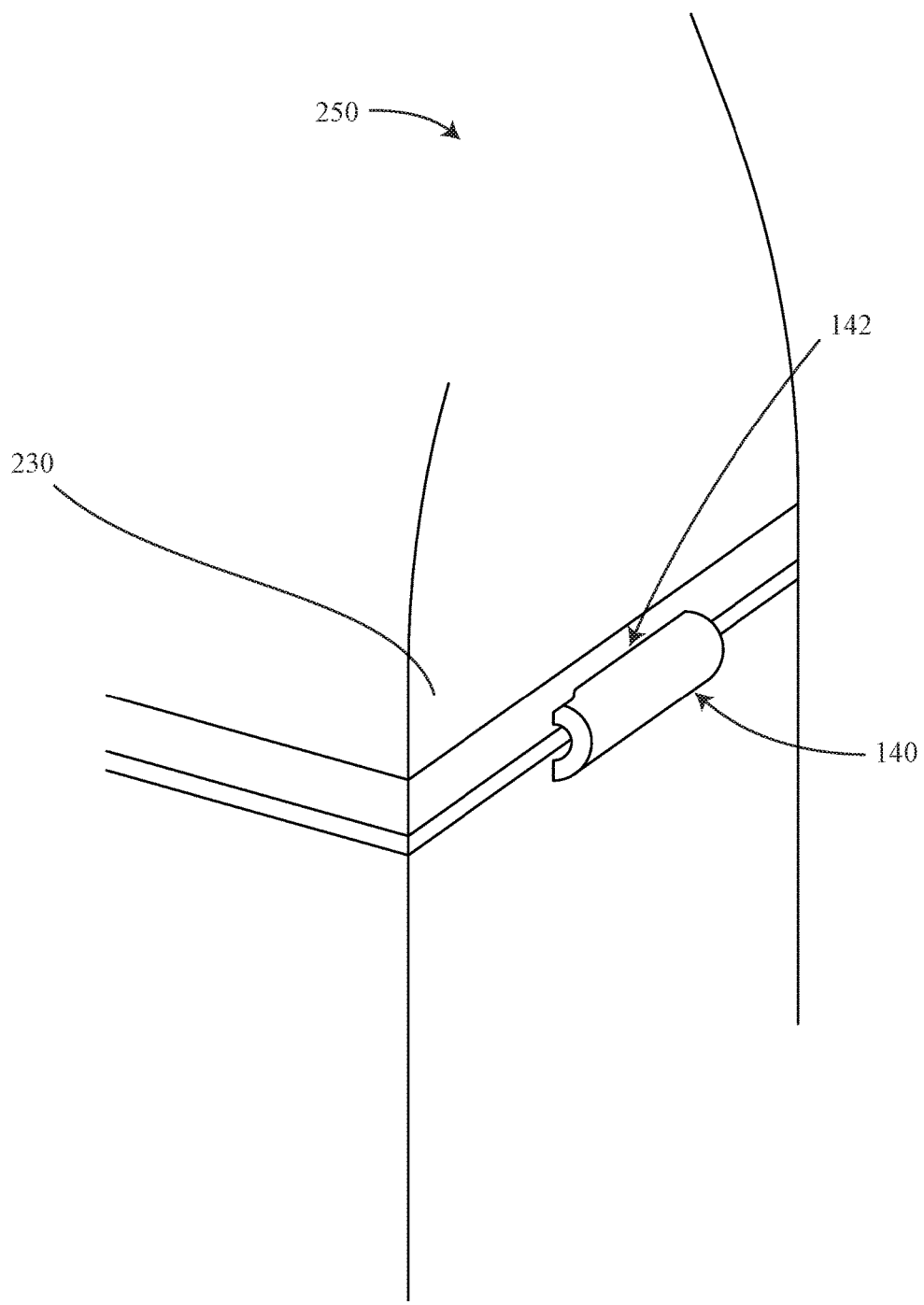
FIG. 2 is a functional diagonal view of the present invention showing a tapered end for transferring debris to a waste collection bag and illustrating a lawn mower bag attached to present invention by means of bag mount tabs and a releasable lever.
Figure 3:
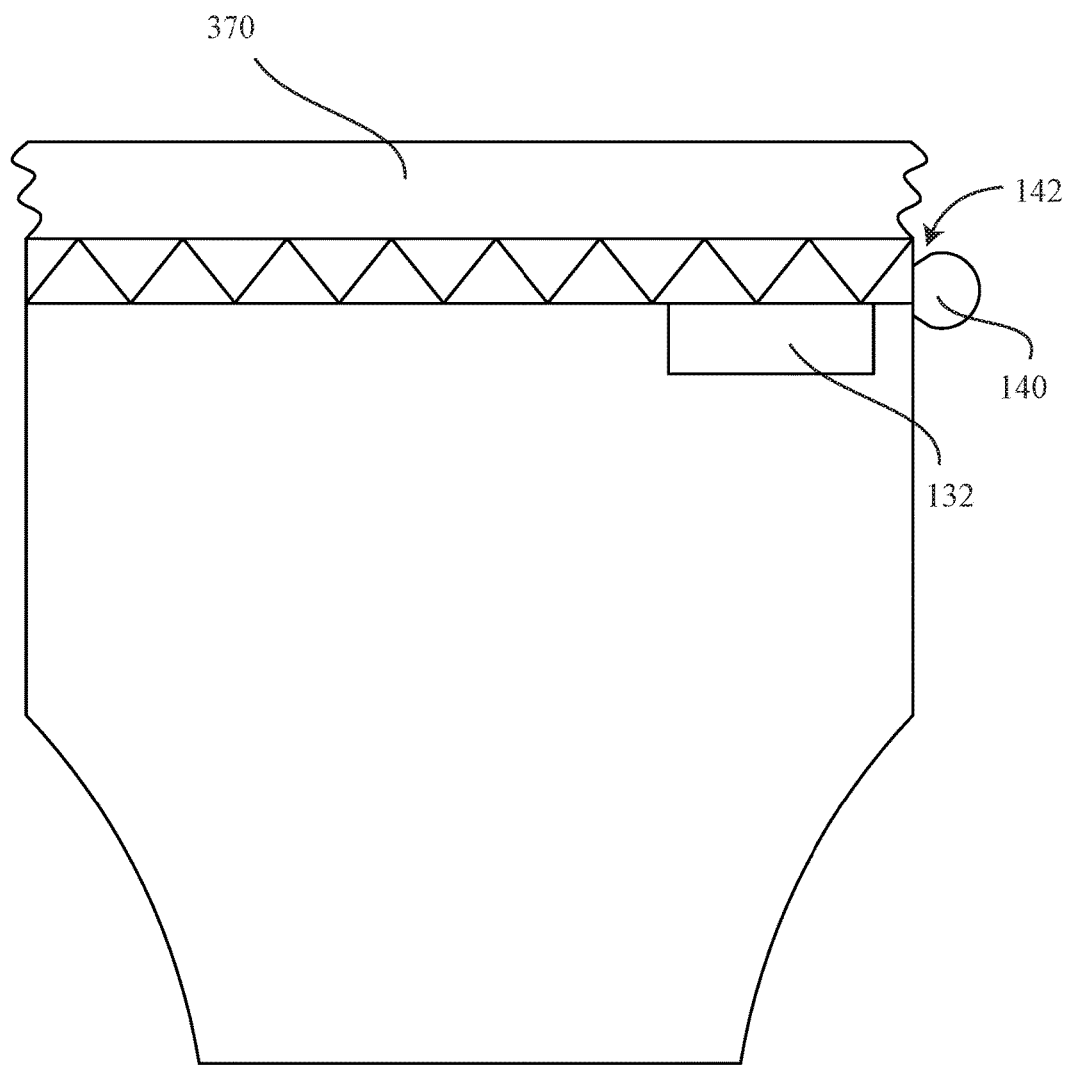
FIG. 3 is a side view of the said mention invention displaying a clearer view of the tapered bottom portion of the Adjustable Chute.

The present invention, hereinafter referred to as the Adjustable Chute, is a specially configured chute that attaches to the frame of the lawn mower grass catcher bag to function as a bridge or funnel between the grass catcher and the collection bag. The Adjustable Chute provides users with an easily attached chute that is tapered at one end. This tapered end allows for quick, easy and neat transfer of grass debris into a paper recycling bag without any need to transfer grass clippings by hand. Fabricated of durable materials, the universal Adjustable Chute is appropriate for use with any model of grass catcher. It's rectangular, open distal end is easily connected to the open grass catcher by means of clamping and mounting system that securely fits onto the framework of the catcher. The Adjustable Chute's proximal end tapers so that it fits into an opening of a waiting brown recyclable waste collection bag. Referring now to FIGS. 1, 1A, 2 and 3. A chute 100 comprises an upper portion 120, a lower portion 160, a clamping system 140 and a handle 132. The upper portion 120 comprises a rectangular opening 122 and a rubber elastic fitting band 370. The lower portion 160 is tapered. The clamping system 140 is characterized by a clamped condition (see FIG. 2) and a free condition (see FIG. 1). In the clamped condition, a tip 142 of the clamping system 140 extends upwardly. In the free condition, the tip 142 of the clamping system 140 extends downwardly. In FIG. 1A, the tip 142 of the clamping system 140 is rotatable about a hinge 144 of the clamping system 140. In FIG. 1A, the tip 142 of the clamping system 140 is rotated to a position between the clamped condition and the free condition. In examples of the present disclosure, the chute 100 further comprises a plurality of springs 180 configured to adjust a size of the rectangular opening 122 of the upper portion 120 of the chute 100 so as to fit a lawnmower bag 230. In examples of the present disclosure, the plurality of springs 180 surround a majority portion of the rectangular opening 122 of the upper portion 120 of the chute 100. In examples of the present disclosure, the plurality of springs 180 are made of steel or aluminum. In examples of the present disclosure, a majority portion of the chute 100 is made of plastic materials. The rectangular opening 122 of the upper portion 120 of the chute 100 is configured to receive a lawnmower bag 230 having an opening 250 being engaged with a lawnmower.

Using the Adjustable Chute is simple and straightforward. Once the Adjustable is installed and secured by means of bag tab mounts and releasable lever, the user only needs to dump the grass from the grass catcher through the Adjustable Chute into the collection bag. After use, the present invention is detached by means of the aforementioned release lever and is conveniently stored away with the lawn mower.

The Adjustable Chute provides user friendly means of disposing yard debris when using grass catchers with lawn mowers. A collection agent between a grass catcher and a collection bag, the Adjustable Chute ensures that all debris is transferred without spilling and making a mess. Most importantly, the Adjustable Chute permits any user, regardless of age, to empty a grass catcher in a hassle free manner. The Adjustable Chute is highly effective in readily improving any yard working experience. Simple in functionality and durably constructed of high quality material, The Adjustable Chute will withstand many years if continued use.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claim.

The invention claimed is:

1. A chute comprising
   an upper portion comprising
      a rectangular opening; and
      a rubber elastic fitting band;
   a lower portion, the lower portion being tapered;
   a clamping system; and
   a handle;
   wherein the clamping system is characterized by
      a clamped condition in which
         a tip of the clamping system extends upwardly; and
      a free condition in which
         the tip of the clamping system extends downwardly.

2. The chute of claim 1, wherein the tip of the clamping system is rotatable about a hinge of the clamping system.

3. The chute of claim 1 further comprising a plurality of springs configured to adjust a size of the rectangular opening of the upper portion of the chute so as to fit a lawnmower bag.

4. The chute of claim 3, wherein the plurality of springs surround a majority portion of the rectangular opening of the upper portion of the chute.

5. The chute of claim 3, wherein the plurality of springs are made of steel or aluminum.

6. The chute of claim 5, wherein a majority portion of the chute is made of plastic materials.

7. The chute of claim 1, wherein the rectangular opening of the upper portion of the chute is configured to receive a lawnmower bag engaged with a lawnmower; and
   wherein a bottom end of the lower portion of the chute is configured to be fitted into an opening of a recyclable waste collection bag.

8. A method of using the chute of claim 7, the method comprising the steps of:
   receiving the lawnmower bag engaged with the lawnmower by the rectangular opening of the upper portion of the chute; and
   fitting the bottom end of the lower portion of the chute into the opening of the recyclable waste collection bag.

9. A method of using the chute of claim 7, the method comprising the steps of:
   receiving the lawnmower bag engaged with the lawnmower by the rectangular opening of the upper portion of the chute;
   moving the tip of the clamping system from the free condition to the clamped condition; and
   fitting the bottom end of the lower portion of the chute into the opening of the recyclable waste collection bag.

* * * * *